B. JACKSON.
Grain Thrasher and Separator.

No. 206,456. Patented July 30, 1878.

Witnesses
Inventor

B. JACKSON.
Grain Thrasher and Separator.

No. 206,456. Patented July 30, 1878.

Witnesses
Jno. L. Boone
Frank A. Brooks

Inventor
Byron Jackson
by Dewey & Co
Attys

5 Sheets—Sheet 5.
B. JACKSON.
Grain Thrasher and Separator.
No. 206,456. Patented July 30, 1878.
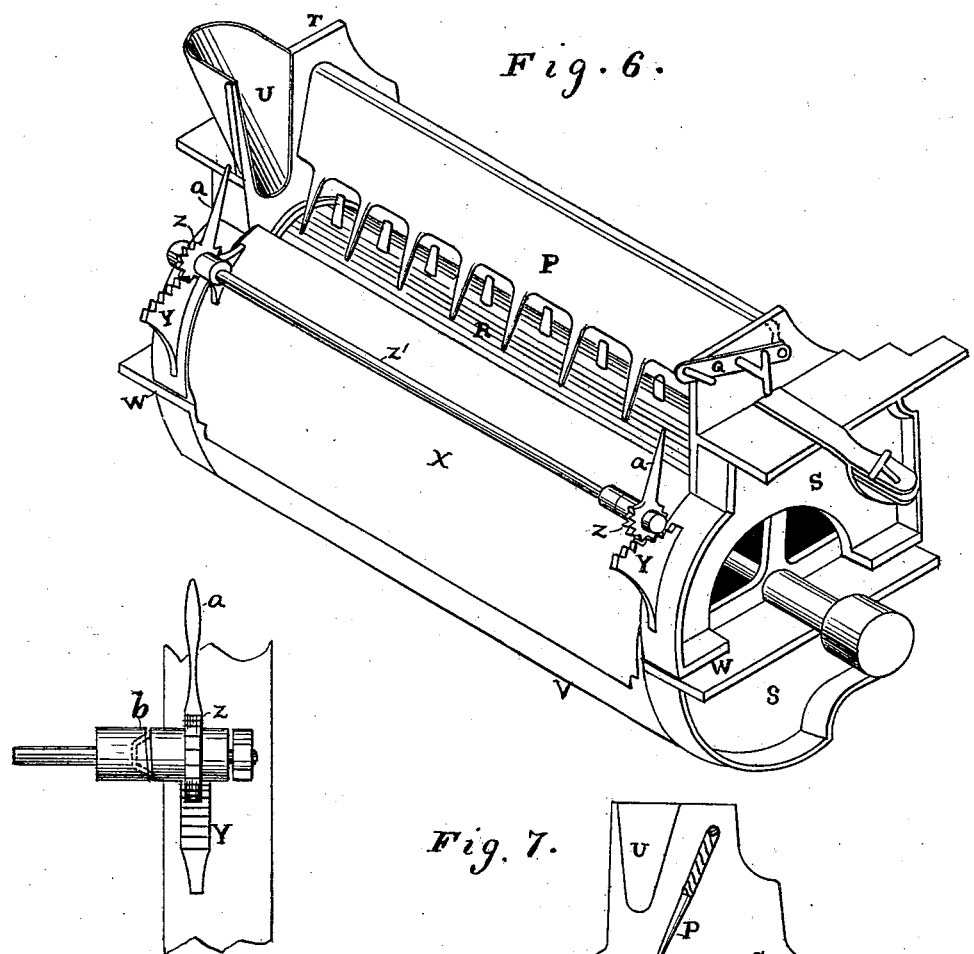
Witnesses
Inventor

UNITED STATES PATENT OFFICE.

BYRON JACKSON, OF WOODLAND, CALIFORNIA.

IMPROVEMENT IN GRAIN THRASHERS AND SEPARATORS.

Specification forming part of Letters Patent No. 206,456, dated July 30, 1878; application filed September 10, 1877.

*To all whom it may concern:*

Be it known that I, BYRON JACKSON, of Woodland, county of Yolo and State of California, have invented an Improved Grain-Thrasher and Separator; and I do hereby declare the following to be a full, clear, and exact description thereof, reference being had to the accompanying drawings.

My invention relates to certain improvements in grain-separators, or machines for thrashing and cleaning grain from the straw and chaff, so as to put it into a marketable condition; and these improvements consist in certain novel combinations of parts, some of which parts are old, and in the details of construction of the same, by which efficiency and durability are much increased.

Figure 1:
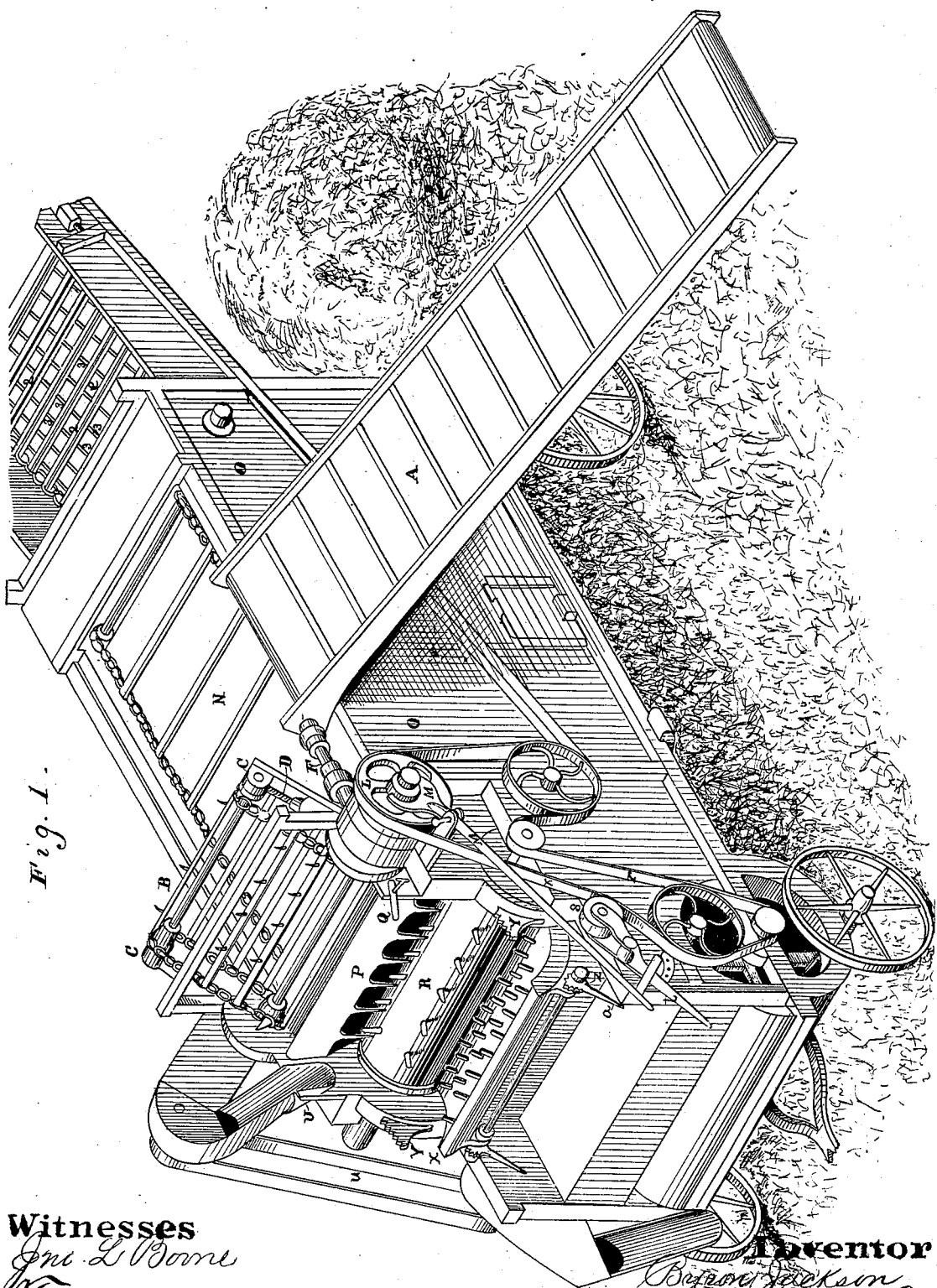
Figure 2:
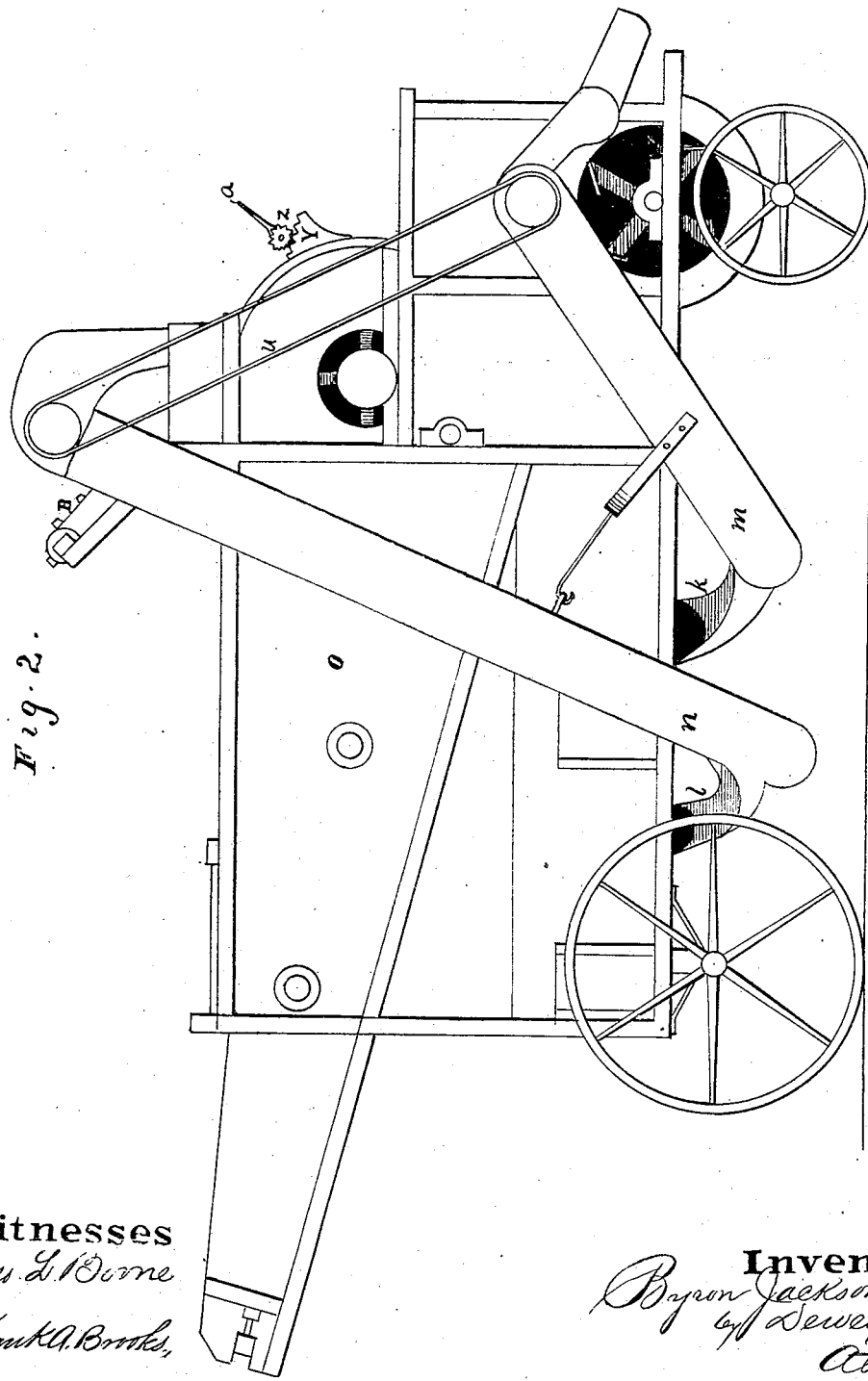
Figure 3:
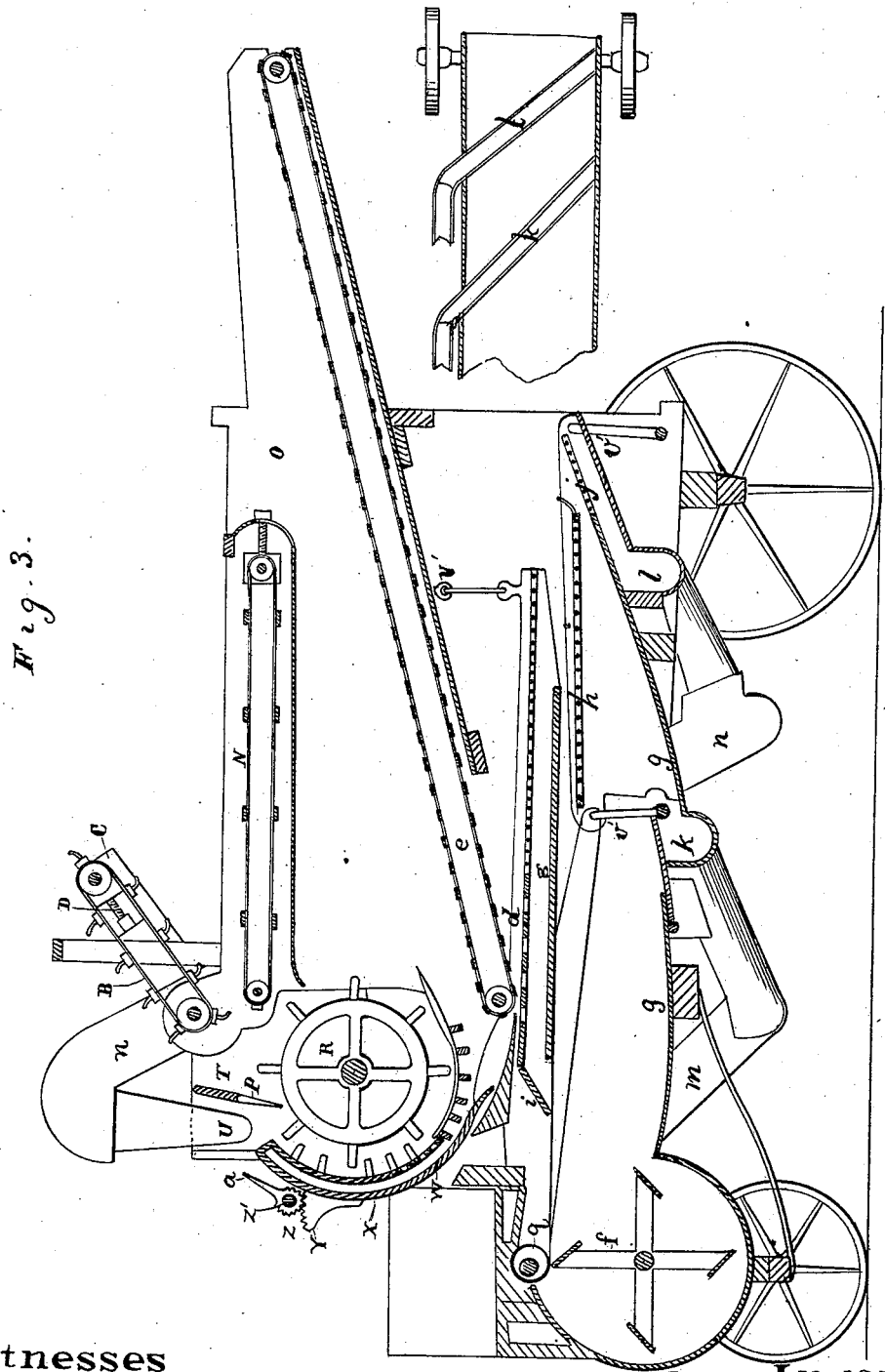
Figure 4:
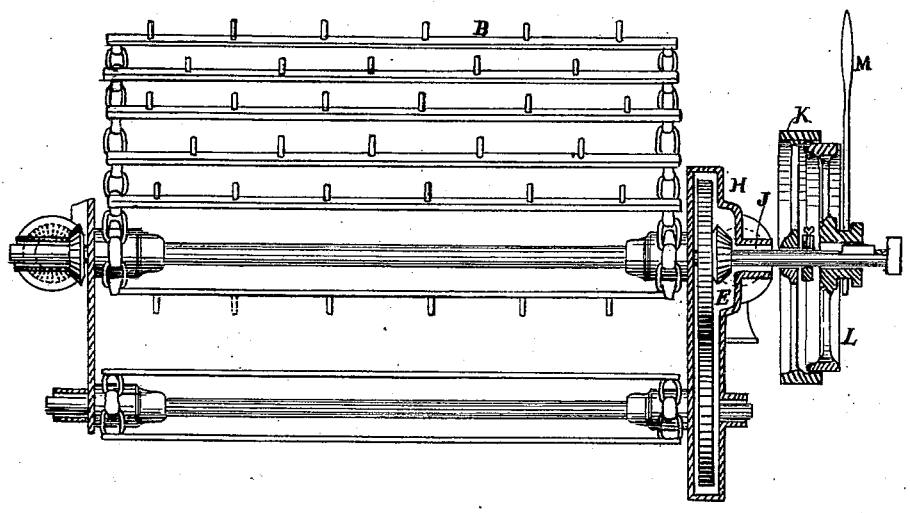
Figure 5:
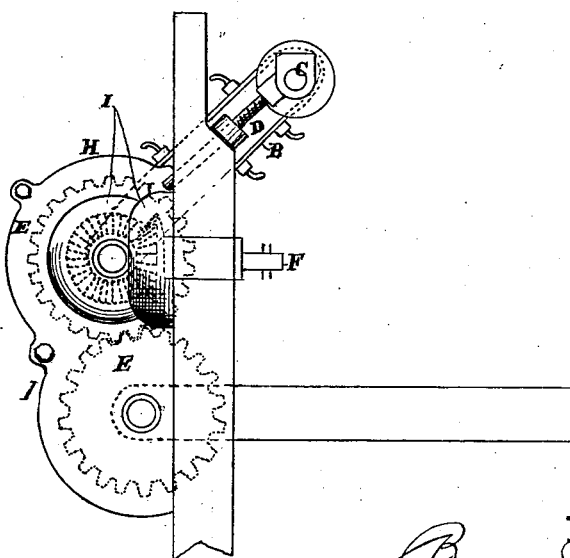

In the accompanying drawings, Figure 1 is a perspective view of my machine complete from one feeding side. Fig. 2 is a side elevation, showing the opposite side. Fig. 3 is a longitudinal section. Figs. 4, 5, 6, 7 are detail views of parts of the machine.

My invention consists of an improved construction of the elevator or conveyer from wagons, stacks, or barns, and a self-feeding thrasher and separator.

The elevator A is an improvement on the patent granted to myself and B. F. Jackson March 8, 1870.

The feeder is an improvement on the patent granted me March 24, 1875; and this improvement consists in mounting the toothed endless feeding-belt B in stationary bearings C, with screws D to tighten the chain-belt, and in the manner of driving the elevator from the feeder by means of gearing E in place of belting, and coupling it with a jointed or flexible shaft, F, to admit of the trough being set at the desired angle from the separator. The three gears E are all nicely housed from the straw, as shown at H, and the three bearings are all fixed in one solid cast hanger, I, instead of being separately bolted to the frame. The gears E are placed inside of the journals J, thus admitting of the pulley K being placed close to the bearing on the outside, and avoiding the springing of the shafting by overhanging pulleys or gears.

The pulley K is provided with a friction-clutch pulley, L, to start and stop the feeder while the cylinder is in motion, and this is done by moving the conical friction-pulley on a feather upon the shaft and actuating it by a clutch-lever, M, thus controlling the feed instantly in case of necessity.

The feeder B N is placed on top of the separator-frame O, and delivers the feed on top of the cylinder and in a line tangential to and in the direction of its motion as it rotates, thus giving a straight delivery for the straw, and a large proportion of the circumference of the cylinder for thrashing and also separating.

In front of the feeder, and directly over the cylinder, I place an adjustable rake, P, for the purpose of spreading the feed, which detains the bunches of grain and straw, so that the cylinder cannot carry it along to the concave in a solid mass, but will allow only as much as the cylinder-teeth can cut through and thrash clean. The supply from the feeder and the weight of the grain will crowd it onto the cylinder as fast as it is thrashed off. The amount the cylinder will take can be regulated by the incline given to the spreading-rake P, by the direction in which the cylinder runs, and by the length of the cylinder-teeth. The spreader is adjusted by a lever-arm, Q, with a pin or rack upon the outside, as shown.

The cylinder R is made either solid or open. The drum-cylinder is preferred; but if the bars are used they are to be placed as close together as practicable. The cylinder is hung in solid cast-iron hangers S, as they are called, which form the casing, the support for the concave, and the bottom half of the box for the cylinder. The upper half of the cylinder-casing T is also of cast-iron, and carries the boxes of the spreading-rake. Above and upon one side is a hopper, U, for the tailings from the return elevator.

The box-hangers S are fastened one to the other with a plate of iron, V, which forms a chute for the grain to the shoe of the cleaning portion or fanning-mill of the machine.

If preferred, these end pieces or hangers may be rigidly united by means of iron rods strained across below the concave by nuts, and by either means these hangers are held parallel and prevented from moving, and the boxes cannot get out of line by the spring of the separator-frame. To more fully explain this point, it may be stated that the cylinder, with its hangers and casing, can be lifted bodily out of the separator-frame, as the device forms an independent rigid frame complete in itself, and not subject to any alterations in the form of the rest of the machine.

In the present method of constructing separators the timbers are very much cut up and made of various sizes, in order to give the requisite width to the different parts of the separator, which gradually widens from the cylinder out to the chaff-piler, and from large timbers mortised to the inner edge of the bed-piece they diminish to small ones mortised into the outer edge of the bed-piece.

By the use of my solid cast-iron hangers and casing I am enabled to avoid all this, and make a simple straight frame of equal-sized timbers with regular mortises and joints, and there is less liability to derangement of the parts by shrinking and swelling than when such unequal-sized timbers are used with the necessarily small joints to bear the strain.

The concave hangers are jointed in the middle at W, so that the top X can be let down to get at the teeth of the cylinder or concaves for repairs. They are held in place by a segment, Y, at each end, cast on the cylinder-casing, and pinions Z upon a shaft, Z', which is secured upon the cover X, mesh with these segments, and thus hold the cover locked in place. Levers $a$ serve to rotate the pinions, so as to lock or unlock them and hold or release the concave X. The hub of the pinion is faced either flat or convex, as shown at $b$, and the box or hanger, against which it is set by a nut, is faced to fit it, so that when screwed up it will be held solid; and by this device the concaves can be adjusted as nicely as may be desired, even to the one-hundredth part of an inch.

The concave $c'$ is made in sections of the same size, of both solid and grate form, with teeth in either, so that they are interchangeable one with the other, and as many grate-concaves can be used as is found necessary to let the grain separate from the straw with the same blow that knocks it out of the chaff. If this is properly adjusted, no more beaters or agitators are required to separate the grain from the straw after it leaves the cylinder, and much useless additional machinery is thus saved.

The cylinder throws the grain through the grates directly into the shoe $d$ of the fanning-mill, and the straw is passed over the grates and discharged onto the straw-carrier $e$, which may be made of leather belts and slats, or any suitable device to carry off the straw with as much agitating as required. I prefer to use chain belts and slats, as represented in drawings, running over square or oblong pulleys that receive their motion from the chain-carrier itself passing over them, thereby saving a complication of belts or other machinery to agitate the straw. If further agitation is required, I would introduce a cylinder or beater of the usual pattern used in the Pitts thrasher over the straw-carrier and close to it, a short distance from the thrashing-cylinder, and speeded nearly as fast, passing the straw under it and separating the grain by the centrifugal force, which is the main principle aimed at in the construction of the machine to separate the grain from the straw.

I have found from experiments and practical work with separators that a blow or any agitation from the under side of the straw requires so nice an adjustment of speed and length of throw that it is impossible to meet all cases, because if the blow is sufficient to start the grain in the direction of the blow it will go farther than the straw, and the grain will be carried along on top, instead of being sifted or jarred loose from the straw and let fall of its own weight; and if the straw is thick it requires a harder blow than if it is thin, while if a fast-running cylinder is applied on the top of the straw and over the carrier, or a set of grates running lengthwise of the cylinder, the straw is passed endwise across the grates at the rate of three thousand feet or four thousand feet per minute, and is consequently very thin—ten or twelve times thinner than when operated on from the under side of a carrier which usually runs at less than three hundred feet per minute. Theoretically the straw is not more than one straw thick, and consequently there is no obstruction to the grain from being thrown off by the centrifugal force of the cylinder, and this I aim to do with the thrashing-cylinder.

My novel construction of the feeder on top of the machine and feeding on top of the cylinder give the room required to make the cylinder do the work of breaking the bunches and spreading the feed before it reaches the concave, then thrashing the grain out of the straw, and at the same time giving the opportunity for the grain to be thrown off and separated from the straw with the one operation of the cylinder, making at once a spreader, thrasher, and separator of the cylinder, saving the complication of other machinery.

If it is desirable to thrash so fast that the one operation is not enough to perfectly separate the grain from the straw, I would introduce more beaters on the principle explained above.

The grain that is saved by the straw-carrier is dragged down by it and discharged into the same dressing-shoe $d$ with the grain from the cylinder. This shoe is provided with a coarse sieve. I prefer sheet-iron punched with large holes for the portion of the sieve that receives the discharge from the cylinder and straw-carriers, because it is not so liable to clog with straw. For the balance of the sieve I use coarse wire. The shoe is subjected to a very strong blast from an overshot fan, $f$, placed beneath the cylinder, and in front of it, over the front axle of the wagon. The blast from this fan is divided, the sharpest portion of it passing through the first shoe, $d$, and the balance is conducted between the first shoe and a floor, *g*, suitably curved to conduct it properly to the second or finishing shoe, *h*, which is provided with one or more sieves that are best adapted to the kind of grain to be cleaned. A wind-guide, *i*, can be hinged to the first shoe, so as to turn more or less of the blast into either shoe. I extend the second shoe a short distance beyond the tail-board, and cover the space with a wire sieve, *j*, to save the grain that may get over the tail-board, and return it with the tailings. The bottom of the shoe is provided with two discharge-spouts, *k* and *l*, running diagonally across it, to facilitate the discharge into the elevators on the side of the machine.

One elevator, *m*, is for clean grain, which is elevated and discharged in front away from the dust of the separator, and in the most convenient place for taking care of it. The other, *n*, is for tailings, which are elevated and discharged into the cylinder again through the hopper.

The shoes have what is known as an "end shake," and are both worked from eccentrics or cranks *q* on the same shaft and at the front end, so that the most violent throw or tossing motion of the upper shoe, *d*, is made nearest the cylinder, while the rear end remains comparatively free from vertical oscillation, and has merely an end shake. The lower shoe is supported upon crank-arms at each end, and is operated by a connecting-rod from the eccentric.

As before described, my discharge-spouts are placed diagonally to the shoe, and this is for the purpose of dispensing with the spiral auger, which is indispensable in the end-shake machine where a transverse spout is used.

In my present device the shake of the shoe is sufficient to discharge from the spout, and I thus do away with the auger and its driving mechanism.

The outer end of the upper and both ends of the lower shoe are supported upon crank-axles *v'*, these axles having their bearings in the outside frame, and by this means I avoid all side motion.

The feeder, elevator, straw-carrier, fan, shoes, and grain-elevators are all driven from the cylinder by one belt, *r*, which is provided with a tightening-pulley, *s*, and lever *t*, to take up the slack of the belt, to save cutting and sewing when it stretches. The tailing-elevator is driven by a small belt, *u*, from the crank-shaft; or it could be driven from the fan or straw-carrier shaft.

The points of superiority I claim for my machine are:

First. Simplicity of construction, avoiding a complication of parts by placing the feeder on top of the machine, so the cylinder rotates from the feeder, and, as it thus takes the straw on in the direction in which it is moving, when it reaches it I avoid letting the feeder drag the grain and straw back, and consequently the breaking of the chain and slats, that is common in my feeder when in front of the cylinder, and I treble the utility of the cylinder. The first quarter of the circumference is used to spread the feed—a very important part. The second and third quarters of the circumference of the cylinder are used both to thrash and separate the grain; and on the fourth quarter is the discharge for the straw, while if the under or overshot feed only is used, less than one-half the circumference of the cylinder is utilized and no separation can take place, and beaters and agitators must be introduced to separate the grain from the straw after it leaves the cylinder.

Second. I have combined the feeder and elevator in one train of gears, avoiding the troublesome quarter-turn belt, and mounting all in one solid pair of hangers, obviating the loosening effects of the jarring motion of the parts, and consequent displacement of the gears, and they are neatly covered from the dust and straw.

Third. I have employed a friction-clutch to stop and start the feeder in an instant, which is very convenient in avoiding accidents, and particularly in regulating the feeder, as it can be allowed to slip so as to run the feeder slower.

Fourth. The knuckle or jointed shafts connecting the elevator to the driving-gear on feeder are much more convenient than the pivoted forked elevator-rest employed in my patent of March 8, 1870.

Fifth. In placing the fan over the front axle I avoid the cramping in short turns without setting the separator on a higher bolster, thus utilizing for the fan the space usually occupied by the bolster alone.

Sixth. By employing two shoes and dividing the blast from an overshot fan, and hanging the finishing-shoe at a greater distance from the fan, I am enabled to better control the wind, and give a very sharp blast where the grain first strikes the riddlers in combination with the up-and-down forward-and-backward shake of the shoe. Theoretically the chaff and grain are suspended in a blast of wind, and as it gets farther from the fan it spreads, and the force of the blast is lessened. The grain, being the heavier, falls through the sieve into the finishing-shoe, where, with proper screens and a milder blast, the grain is more thoroughly cleaned and saved than is possible in only one shoe, with only one sieve set close to the fan, where the wind is much more difficult to control.

Seventh. With the two shoes I am enabled to have two kinds of shake. In the first a combined up and down with the horizontal, which assists the winnowing, and in the second a level shake—the most favorable for screening.

Eighth. The employment of chain for straw-carriers, with attachment 2 on every two or three links, so that two riveted to one link, with wires 3 through them, will form a finer carrier without offering so much surface to carry grain, and the sections, as they turn around the pulleys, will open and facilitate the discharge of that worked inside of the carrier by the shakers. This will save the fanning-mill a great deal of work.

Ninth. The grain is elevated to the front of the separator in the cleanest and most convenient place for taking care of it.

Tenth. My machine is made tight at bottom, top, and side, compelling the dust to go out with the chaff.

Having thus described my invention, what I claim, and desire to secure by Letters Patent, is—

1. The combination, with the feeder and elevator, of the mechanism for operating them, consisting of the gearing E, journaled in the solid cast hanger I, whereby said gearing is rigidly held together, substantially as shown, and for the purpose herein described.

2. The combination, with the cylinder and feeder of a thrasher, of conveying mechanism for bringing the straw to said feeder, geared together, as described, and clutch or other mechanism for connecting and disconnecting said feeder at will, substantially as shown, and for the purpose herein described.

3. The combination, with the thrashing-cylinder and the concave, of the feeder N, mounted in the top of the machine and conducting the grain to the cylinder in a line substantially tangential to its rotation, substantially as shown, and for the purpose herein described.

4. The jointed concave hangers, having the movable cap X, arranged to be thrown back, as shown, to allow access to the concave, and the adjusting device, consisting of the segments Y and pinions Z, substantially as shown, and for the purpose herein described.

5. The combination, with segment Y, of the lever formed with pinion-hub, having the plain or convex face B, with a corresponding meeting of the hanger faces, these being forced together by a jam-nut, substantially as shown, and for the purpose herein described.

6. The cylinder-hangers and end casings, cast in one piece, and secured together by a plate of iron, V, so as to form a complete cylinder-case, with boxes kept in line independently of any supporting-frame, substantially as shown, and for the purpose herein described.

7. The spreader P, mounted above the cylinder and having the adjusting device Q, in combination with the feeder and thrashing-cylinder, substantially as shown, and for the purpose herein described.

8. The thrashing-cylinder B, having the feeder N, delivering the straw up on the top in a line tangential to and in the direction of its rotation, in combination with the concave $c'$, having the solid and grated sections, substantially as shown, and for the purpose herein described.

9. In combination with the dressing-shoe $g'$, mounted upon the eccentric $q$ at the front and the arm $u'$ at the rear, the finishing-shoe $h$, mounted upon the oscillating arms $v'$ and having a connecting-rod to the eccentric $q$, so as to produce by means of the same crank or eccentric in one shoe a compound motion and a direct end shake in the other, substantially as shown, and for the purpose herein described.

10. The fan-blast wheel F, mounted at the front end of the machine above the wheels, so that its case F' occupies the position of a bolster and allows the front wheels to be turned freely beneath the body, thus enabling the size of the machine to be reduced, substantially as shown, and for the purpose herein described.

11. The combination, with the feeder and elevator, of the gearing E, journaled in the solid hanger I, and provided with the housing H, substantially as shown, and for the purpose herein described.

In witness whereof I have hereunto set my hand and seal.

BYRON JACKSON. [L. S.]

Witnesses:
  HENRY SCHRIBER,
  CHAS. D. BEACH.